May 23, 1961 L. R. DICKARD 2,985,554
METHOD OF RENDERING A WEB NON-ADHERENT TO A PRESSURE-SENSITIVE
ADHESIVE AND ARTICLE PRODUCED THEREBY
Filed Aug. 14, 1957
PROTECTING OR BACKING WEB
RELEASE COATED FACE
PRESSURE SENSITIVE ADHESIVE SURFACE
SECOND OR PROTECTED WEB
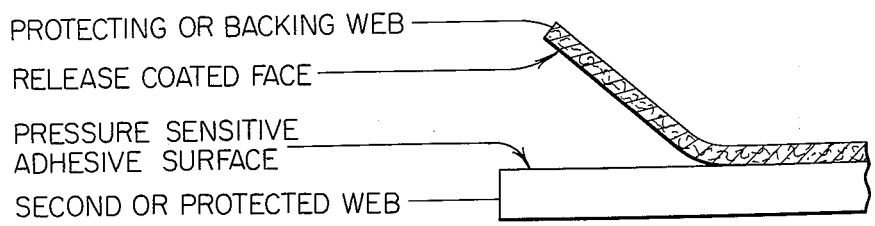
INVENTOR.
LESTER R. DICKARD
BY
Attorneys United States Patent Office 2,985,554
Patented May 23, 1961

2,985,554
METHOD OF RENDERING A WEB NON-ADHERENT TO A PRESSURE-SENSITIVE ADHESIVE AND ARTICLE PRODUCED THEREBY

Lester R. Dickard, Painesville, Ohio, assignor, by mesne assignments, to Avery Adhesive Products, Inc., Monrovia, Calif., a corporation of California Filed Aug. 14, 1957, Ser. No. 678,040

7 Claims. (Cl. 154—53.5)

This invention relates to a method for preparing coatings on material used to protect the adhesive of pressure-sensitive products such as tapes, sheets, etc.

It has been known to employ coatings on paper and other web materials to facilitate the release thereof from adhesive materials. However, attempts to employ silicones in such applications have not provided satisfactory results. In some cases, the silicone in the coating has migrated into the adhesive adjacent thereto resulting in a loss in tackiness of the adhesive. In other cases, it has been extremely difficult to achieve release of the adhesive material from the silicone coating due to lack of a uniform coating on the web and/or migration of the silicone into the web itself. Attempts have been made to pre-coat the web with various film forming materials to inhibit or prevent migration of the silicone into the web but this is expensive and time consuming. Such prior pre-coating attempts have contemplated that following the application of the film former material, allowances be made for it to mature (as by drying or setting) toward a condition of increased resistance to silicone migration.

A teaching of the present invention is that under the proper circumstances no such allowances need be made, and that the silicone may be applied under conditions more clearly associated with the application of the film former than heretofore practiced or thought possible, even unto the simultaneous or substantially simultaneous application of the film former and silicone, and further even unto their application as a single coating composition in which the silicone polymer concentrates itself at the interface with the adhesive and thereby produces a maximum effect for a given amount of the silicone polymer. Although this phenomenon is not presently clearly understood, it is believed to be caused by a migration of the silicone through the coating to the adhesive-release coat interface. But in any event, the earlier difficulties of migration into the adhesive itself to destroy the tackiness thereof and migration into the fibrous web to destroy the release properties do not take place when employing the coating compositions of the present invention.

In accordance with the present invention, a silicone polymer composition comprising a major proportion of a dimethylpolysiloxane and a minor proportion of a methylhydrogenpolysiloxane; nitrocellulose as an organic film-forming material; a silicone curing catalyst and an inert organic solvent are combined and the resulting composition is formed into a film between a web which is the protecting member and a pressure-sensitive adhesive product such as a tape, sheet, etc. which is to be protected by the protecting member.

The resulting article comprises a protecting backing web with a release coated face and a second web, such as a tape, sheet, etc., which has a pressure sensitive adhesive surface, as diagrammatically shown in the accompanying drawing. In the accompanying drawing, the protecting backing web is shown partially stripped or removed from the second or protected web.

As stated above, the silicone polymer compositions of the present invention comprise a major proportion of a dimethylpolysiloxane and a minor proportion of a methylhydrogenpolysiloxane. The quantities of the dimethylpolysiloxane and the methylhydrogenpolysiloxane in the polymer composition may be varied within the above proportions depending upon the particular adhesive employed in the pressure-sensitive product and the degree of release desired. The "degree of release" is the relative force required to separate the silicone-coated protecting member from the contiguous adhesive material. Advantageously, the methylhydrogenpolysiloxane comprises less than about 5% by weight of the composition and preferably between about 0.1% and 5%. Suitable materials of this type are sold by Dow Corning Corporation as XT-4462.

The viscosity of the nitrocellulose selected may vary over a wide range from about ½ second to about 400 seconds or more at 70° F. and may be either of the alcohol-soluble type or the alcohol-insoluble type depending upon the particular results desired. The expression of viscosity in "seconds" is based on the well-known and generally accepted determination of viscosity using a No. 4 Ford cup.

The inert organic solvent employed may be any of the common well-known solvents such as toluene, xylene, etc.; alcohols, e.g., methanol, ethanol, propanol, butanol, etc.; esters, e.g., ethyl acetate, butyl acetate, etc.; ketones, e.g., methylethyl ketone, etc.; and the like. The solvents also may be used as mixtures, if desired. However, it is important that the particular solvent or mixture chosen be inert to the other materials in the silicone coating composition.

Catalysts are incorporated into the coating composition to increase the curing rate of the silicone polymers. Among the catalysts which are suitable as curing agents for the silicone polymers of the present invention are those commonly referred to as "driers" such as the metallic salts of carboxylic acids. For example, the lead, iron, zinc, tin, copper, aluminum, magnesium, cadmium, cobalt, nickel, sodium, etc. salts in the form of acetates, hexoates, octoates, oleates, stearates, naphthenates, laurates, etc. may be employed. Particularly useful are the lead, iron, zinc and tin hexoates, octoates and naphthenates.

If desired, other materials may be included in the coating compositions providing, however, they do not have a deleterious effect either upon the coating composition, the fibrous web protecting member or the pressure-sensitive adhesive material. For example, materials may be employed to improve the bond between the organic film-forming material and the fibrous protecting member. In addition, plasticizers for the organic film-forming material such as dibutyl phthalate, etc., also may be included in the coating composition.

The relative proportions of the various components in the coating composition can be varied over a considerable range depending upon the results desired, the adhesive being employed, the particular protecting member selected, the degree of release desired and the viscosity of the coating composition employed. Advantageously, the viscosity of the coating compositions of the present invention is between about 50 and 400 centipoises at 70° F. Generally, the silicone polymers comprise between about 1 and 10% by weight of the coating composition and preferably between about 1% and 5%. The percentage of the organic film-forming composition also may be varied over a considerable range depending in part upon the viscosity of the particular film-former selected. For example, when employing nitrocellulose, the percentage can be between about 3% and 30% by weight of the coating composition with the high part of the range, e.g., about 20% to 30%, being employed with nitrocellulose having viscosities between about ½ and 6 seconds at 70° F. and the lower part, e.g., about 3% to 10%, with viscosities between about 40 and 400 seconds at 70° F. The catalyst will generally comprise between about 0.5 and 4% by weight of the metal constituent present, based on the weight of the silicone polymers. The amount of the inert organic solvent will vary depending upon the viscosity of the coating composition desired, which in turn will be determined in part by the type of coating equipment employed.

As stated above, the silicone coating composition is placed in contact with a web which is employed as an adhesive-protecting member. The web material is most appropriately a fibrous web material and it may be a cellulosic material such as paper, cloth or like material. Preferably, the fibrous web material is paper, for example, glassine, parchment, kraft, etc.

The silicone coating compositions of the present invention may be applied to the fibrous web material by any convenient method. When applied to paper, conventional roller or dip coating equipment may be used.

The silicone-coated protecting member may then be heated to cure the silicone polymer thereon. This curing may be performed by any of the conventional curing methods. For example, treated paper may be heated at temperatures of 150 to 300° F., while continuously moving, for a period of several minutes and immediately placed in contact with the pressure-sensitive adhesive to complete the product. If desired, a coated protecting paper may be dried at a lower temperature, e.g., about 150° F., and thereafter rolled up and the curing continued at room temperature for a longer period of time, e.g., two or three days. After the curing period, the protecting paper may then be placed in direct contact with the pressure-sensitive adhesive material.

The pressure-sensitive adhesive material employed in accordance with the present invention may be any of the conventional water-insoluble rubber, resinous or asphaltic-type adhesives well-known in the rubber industry. The following are examples of typical adhesive formulations of the present invention:

A

| | Grams |
|---|---|
| Latex crepe paper | 50 |
| Butadiene-styrene rubber copolymer | 50 |
| Non-oxidizing resin | 40–60 |
| Aliphatic solvent (e.g., hexane) | 550 |

Preferably there is added a small amount, say one part, of an antioxidizing agent, several of which will be familiar to the art.

B

| | Grams |
|---|---|
| Polyisobutylene | 100 |
| Monomeric plasticizer (e.g., di-octyl phthalate) | 35 |
| Terpene resin (e.g., piccolyte) | 40 |
| Aliphatic solvent (e.g., hexane) | 500 |

C

| | |
|---|---|
| GR–S rubber (the standard synthetic rubber made in U.S. Government plants produced by polymerization of 75 parts of butadiene and 25 parts of styrene) | 100 |
| Non-oxidizing pentaerythritol resin | 50 |
| Aliphatic solvent | 450 |

D

| | |
|---|---|
| Polyvinyl ether (high molecular weight Bakelite polymer EDBM) | 100 |
| Polyvinyl ether (low molecular weight Bakelite polymer EDBC) | 20 |
| Stabilizer (mono tertiary butyl hydroquinone) | 2 |
| Aliphatic solvent | 500 |

The following example describes a specific embodiment of the invention, but is not to be construed as limiting the scope of the invention.

The following ingredients were combined—135 grams of toluene, 50 grams of butyl acetate, 20 grams of methyl ethyl ketone, 20 grams of butanol, 30 grams of RS ½ second nitrocellulose, 5 grams of a styrene-modified alkyd resin as a plasticizer for the nitrocellulose and 1 gram of 2-ethyl tin hexoate. To this mixture was added 27 grams of a 30% solution in toluene of a composition comprising about 2% methylhydrogenpolysiloxane and about 98% dimethylpolysiloxane. The resulting composition was cast onto a glassine web material by means of a rotagravure coater. The coated web was then dried for 2 minutes at about 280° F. and the resulting dried web then placed in contact with an adhesive coated tape by means of laminating rollers. The adhesive was GR–S formulation C listed above. Immediately after lamination, two strips 1″ by 8″ in size were cut from the sample. One strip was used to measure the force, in grams per square inch at a speed of 400 inches per minute, necessary to peel the adhesive tape from the glassine web by means of a horizontal peel back machine. The other sample was used to test the adhesive strength according to ASTM procedure D1000–55T. Both methods are known to those skilled in the industry. Strips were subjected to these tests immediately after preparation and again after aging in an oven at 120° F. for 16 hours, 3 days, 7 days and 21 days. After each of these aging periods, the strips prepared as above were tested and found to have substantially the same degree of release, the force being in the range of 30 to 40 grams per square inch and the adhesive strength remained constant at about 1.5 pounds per square inch.

In contrast to the above, a similar composition was prepared but the silicone polymer employed was a methyl hydrogenpolysiloxane (Dow Corning DC–1107). Strips prepared with this composition were tested and the results compared with those above. It was found that although the sample had an initial release force of 75 grams per square inch and an initial adhesive strength of 1.3 pounds per square inch, after being aged in an oven at 120° F. for only 16 hours, the glassine paper could not be separated from the adhesive with any amount of force available under the test procedure.

From the foregoing description of the present invention, it will be apparent that many formula variations may be employed and that the invention is not limited to the particular details described by way of illustration, except as expressly required by the terms of the appended claims.

What is claimed is:

1. The method of rendering a web releasably adherent to a pressure-sensitive adhesive which comprises applying a release coating composition to form a film on said web material, said release coating composition comprising a silicone polymer composition comprising a dimethylpolysiloxane and a methylhydrogenpolysiloxane; between about 3% and 30% by weight of nitrocellulose; a silicone curing agent and an inert organic solvent; said methylhydrogenpolysiloxane comprising up to about 5% by weight of said silicone polymer composition.

2. The method of rendering a web releasably adherent to a pressure-sensitive adhesive which comprises applying a release coating composition to form a film on said web material, and heating said coated web material to an elevated temperature to cure said film, said release coating composition comprising a silicone polymer composition comprising a dimethylpolysiloxane and a methylhydrogenpolysiloxane; between about 3% and 30% by weight of nitrocellulose; a silicone curing agent and an inert organic solvent; said methylhydrogenpolysiloxane comprising up to about 5% by weight of said silicone polymer composition.

3. The method of rendering a web of fibrous material releasably adherent to a pressure-sensitive adhesive which comprises applying a release coating composition to form a film on said fibrous web material, and heating said coated fibrous web material to an elevated temperature to cure said film, said release coating composition comprising between about 1% and 10% by weight of a silicone polymer composition comprising a dimethylpolysiloxane and a methylhydrogenpolysiloxane; between about 3% and 30% by weight of nitrocellulose; a silicone curing agent and an inert organic solvent; said methylhydrogenpolysiloxane comprising between about 0.1 and 5% by weight of said silicone polymer composition.

4. The method of rendering a web of fibrous material releasably adherent to a pressure-sensitive adhesive which comprises applying a release coating composition to form a film on said fibrous web material, said release coating composition comprising between about 1% and 5% by weight of a silicone polymer composition comprising a dimethylpolysiloxane and a methylhydrogenpolysiloxane; between about 3% and 30% by weight of nitrocellulose; a silicone curing agent and an inert organic solvent; said release coating composition having a viscosity between about 50 and 400 centipoises at 70° F.; said methylhydrogenpolysiloxane comprising between about 0.1% and 5% by weight of said silicone polymer composition.

5. A pressure-sensitive adhesive product comprising an adhesive protecting web, a release coating on said web and a second web having a pressure-sensitive adhesive surface releasably adhered to said release coating surface of said protecting web, said release coating comprising a silicone polymer composition comprising a dimethylpolysiloxane and a methylhydrogenpolysiloxane; between about 3 and 30 parts by weight of nitrocellulose; and a silicone curing agent; said methylhydrogenpolysiloxane comprising up to about 5% by weight of said silicone polymer composition.

6. A pressure-sensitive adhesive product comprising an adhesive protecting web, a release coating on said web and a second web having a pressure-sensitive adhesive surface releasably adhered to said release coating surface of said protecting web, said release coating comprising between about 1 and 10 parts by weight of a silicone polymer composition comprising a dimethylpolysiloxane and a methylhydrogenpolysiloxane; between about 3 and 30 parts by weight of nitrocellulose; and a silicone curing agent; said methylhydrogenpolysiloxane comprising between about 0.1% and 5% by weight of said silicone polymer composition.

7. A pressure-sensitive adhesive product comprising a fibrous adhesive protecting web, a release coating on said web and a fibrous second web having a pressure-sensitive adhesive surface releasably adhered to said release coating surface of said protecting web, said release coating comprising between about 1 and 5 parts by weight of a silicone polymer composition comprising a dimethylpolysiloxane and a methylhydrogenpolysiloxane; between about 3 and 30 parts by weight of nitrocellulose; and a silicone curing agent; said methylhydrogenpolysiloxane comprising between about 0.1% and 5% by weight of said silicone polymer composition.

References Cited in the file of this patent

UNITED STATES PATENTS

| | | |
|---|---|---|
| 2,269,712 | Drew | Jan. 13, 1942 |
| 2,511,296 | Rust | June 13, 1950 |
| 2,588,367 | Dennett | Mar. 11, 1952 |
| 2,588,393 | Kauppi | Mar. 11, 1952 |
| 2,612,482 | Rasmussen | Sept. 30, 1952 |

FOREIGN PATENTS

| | | |
|---|---|---|
| 697,240 | Great Britain | Sept. 16, 1953 |
| 767,797 | Great Britain | Feb. 6, 1957 |

UNITED STATES PATENT OFFICE
CERTIFICATE OF CORRECTION

Patent No. 2,985,554                          May 23, 1961

Lester R. Dickard

It is hereby certified that error appears in the above numbered patent requiring correction and that the said Letters Patent should read as corrected below.

Column 1, line 39, for "clearly" read -- closely --.

Signed and sealed this 17th day of October 1961.

(SEAL)
Attest:

ERNEST W. SWIDER
Attesting Officer

DAVID L. LADD
Commissioner of Patents
USCOMM-DC